United States Patent
Khitrin (10) Patent No.: US 11,605,194 B2
(45) Date of Patent: Mar. 14, 2023

(54) DYNAMIC SIMULATION OF INTERACTION BETWEEN WATER AND AN OBJECT

(71) Applicant: Square Enix Ltd., London (GB)

(72) Inventor: Konstantin Khitrin, Pacifica, CA (US)

(73) Assignee: Square Enix Ltd., London (GB)

( * ) Notice: Subject to any disclaimer, the term of this patent is extended or adjusted under 35 U.S.C. 154(b) by 73 days.

(21) Appl. No.: 17/195,598

(22) Filed: Mar. 8, 2021

(65) Prior Publication Data

US 2022/0284651 A1 Sep. 8, 2022

(51) Int. Cl.
*G06T 13/60* (2011.01)
*A63F 13/57* (2014.01)

(52) U.S. Cl.
CPC .............. *G06T 13/60* (2013.01); *A63F 13/57* (2014.09); *G06T 2210/21* (2013.01); *G06T 2210/24* (2013.01)

(58) Field of Classification Search
CPC . G06T 13/60; G06T 2210/24; G06T 2210/21; A63F 13/57
See application file for complete search history.

(56) References Cited

U.S. PATENT DOCUMENTS

| | | | | |
|---|---|---|---|---|
| 6,285,968 B1* | 9/2001 | Motoyama | .............. | G06F 30/23 703/2 |
| 8,204,725 B1* | 6/2012 | Thuerey | .................. | G06T 13/60 345/473 |
| 8,970,592 B1* | 3/2015 | Petterson | ................ | G06T 13/60 345/475 |
| 2008/0319722 A1* | 12/2008 | Anderson | ............... | G06F 30/20 703/2 |
| 2010/0036650 A1* | 2/2010 | Rogers | .................... | G06F 30/20 703/5 |
| 2011/0307837 A1* | 12/2011 | Cohen | ................. | G06F 3/04815 345/473 |
| 2016/0063140 A1* | 3/2016 | Kang | ..................... | G06F 30/00 703/1 |
| 2020/0364388 A1* | 11/2020 | Umetani | ................ | G06T 17/20 |
| 2021/0272346 A1* | 9/2021 | Stomakhin | ............... | G06T 7/62 |
| 2022/0075918 A1* | 3/2022 | McGregor | .......... | G06F 3/04815 |

OTHER PUBLICATIONS

Ang, N. et al. "The Technical Art of Sea of Thieves." ACM SIGGRAPH 2018 Talks, Aug. 12-16, 2018, pp. 1-2.

(Continued)

*Primary Examiner* — Phi Hoang
(74) *Attorney, Agent, or Firm* — Fenwick & West LLP (57) ABSTRACT

A view of a virtual environment that includes a body of fluid is rendered by a method that includes dividing the body of fluid into a plurality of tiles having consistent size and shape and generating a distribution of waves for the plurality of tiles. A reactive region overlaying at least some of the plurality of tiles is defined and an object within the reactive region is identified. The method further includes determining an influence of the object on fluid within the reactive region, simulating motion of the fluid in the reactive region using the determined influence of the object, and rendering a frame of a video sequence including the view of the virtual environment, the view including a visual representation of at least a portion of the body of fluid.

20 Claims, 5 Drawing Sheets

(56) References Cited

OTHER PUBLICATIONS

GDC. "Wakes, Explosions: Prototype." Game Developers Conference #GDC19, Mar. 18-22, 2019, pp. 1-6.
Tessendorf, J. "eWave: Using an Exponential Solver on the iWave Problem." Clemson.edu, Mar. 16, 2014, pp. 1-6.
Tessendorf, J. "Interactive Water Surfaces." Rhythm and Hues Studios, Game Programming Gems 4, 2004, pp. 1-10.
Tessendorf, J. "Simulating Ocean Water." SIGGRAPH '99, Jan. 2001, pp. 1-19.

* cited by examiner

DYNAMIC SIMULATION OF INTERACTION BETWEEN WATER AND AN OBJECT

BACKGROUND

The present disclosure generally relates to electronic games, and in particular to simulating and rendering bodies of water.

Modern electronic games are set in a wide array of environments, from desserts to outer space and medieval battle fields to futuristic metropolises. One class of environments that presents particular challenges is those that include large bodies of water such as parts of oceans or lakes. Providing accurate representations of features such as waves and currents is a challenge in isolation, requiring clever simplification techniques, large amounts of memory and processing power, or both. Introducing the complexity of game objects, such as ships, characters, and flotsam, that may interact with the body of water further complicates matters. Players have expectations from real world experience of how floating objects should respond to waves and other disturbances in the water and how the water should respond to objects moving through it. Calculating these effects at run time places additional demands on the available processing power and memory.

SUMMARY

In various embodiment, view of a virtual environment that includes a body of fluid is rendered by a method that includes dividing the body of fluid into a plurality of tiles having consistent size and shape and generating a distribution of waves for the plurality of tiles. A reactive region overlaying at least some of the plurality of tiles is defined and an object within the reactive region is identified. The method further includes determining an influence of the object on fluid within the reactive region, simulating motion of the fluid in the reactive region using the determined influence of the object, and rendering a frame of a video sequence including the view of the virtual environment, the view including a visual representation of at least a portion of the body of fluid.

The distribution of waves may be generated using a Joint North Sea Wave Observation Project (JONSWAP) spectrum. Determining the influence of the object on fluid within the reactive region may include calculating a pressure (e.g., the ram pressure) exerted by the object on the fluid within the reactive region. The distribution of waves may be generated in the frequency domain while the pressure may be calculated in the spatial domain. The method may further include converting the pressure into the frequency domain.

Simulating the motion of the fluid in the reactive region may include determining a disturbance to the fluid in the reactive region caused by the influence of the object and propagating the disturbance through the reactive region, wherein the disturbance is damped as it propagates through the reactive region. The method may further include determining that the object will interact with the fluid in the reactive region based on one or more properties of the object.

The method may further include identifying a second object having a collision volume that intersects with the body of fluid, determining that the second object does not influence the fluid within the reactive region, determining a force exerted by the fluid in the reactive region on the second object, and simulating motion of the second object using the force exerted by the fluid on the second object.

The figures depict various embodiments of the present disclosure for purposes of illustration only. Wherever practicable, similar or like reference numbers are used in the figures to indicate similar or like functionality. Where elements share a common numeral followed by a different letter, this indicates the elements are similar or identical. A reference to the numeral alone generally refers to any one or any combination of such elements, unless the context indicates otherwise. One skilled in the art will recognize from the following description that alternative embodiments of the structures and methods described may be employed without departing from the disclosed principles.

DETAILED DESCRIPTION

This disclosure describes aspects of a virtual environment in a gameplay session. A gameplay session is an instance of gameplay of an electronic game. The gameplay session may be played upon a client device. A user may participate in the gameplay session via the client device. The virtual environment includes a representation of a body of fluid (e.g., water) and one or more objects. Note that the following description assumes that the fluid is water, but the same or similar principles to those described may be applied to simulating other fluids.

The objects are included in a gameplay session for display or interaction. For example, one object may represent a ship, another object may represent a character (e.g., an enemy, a comrade, etc.), and yet another object may represent debris. As the user pays the electronic game, one or more objects may interact with the body of water. For example, the client device may receive input from a user triggering a gameplay action that causes an object to enter or be propelled through the body of water. Alternatively, objects may be located in the body of water for other reasons, such as an action by a non-player character (NPC) controlled by the electronic game, a scripted event included in the electronic game, or being instantiated in the body of water at the start of the gameplay session, etc.

In various embodiments, the body of water is simulated in two parts. The majority of the body of water is simulated using a tiling technique. Disturbances such as waves are modelled for a single tile by applying a modeling technique such as a Fast Fourier Transform (FFT) algorithm to random or pseudo random noise and repeating the tile as many times as desired. A reactive region in which one or more objects may influence the body of water is modelled separately. In this region, the simulation is not tiled and interactions between the objects and the water are modelled. An object may either experiences forces due to the body of water or exerts forces on the body of water, but not both. For example, a large object such as a ship may exert force on the body of water (and optionally use a predetermined or randomized bobbing motion to efficiently simulate the effects of the water on the object without requiring significant computation) and create a wake while a smaller object may experience forces due to the water to more believably respond to the waves. Limiting the influence of objects on the water to the reactive region may reduce the computational resources needed to generate a believable simulation of the body of water.

Limiting the interaction between the object and the water to a one-way interaction avoids the possibility of instabilities caused by self-interaction. In another embodiment, the object and the water both exert forces on each other in a two-way interaction. This may produce a more believable representation of the object and body of water at the expense of using more computing resources to prevent (or at least reduce the likelihood) of instabilities occurring in the simulation.

Example Systems

Figure 1:
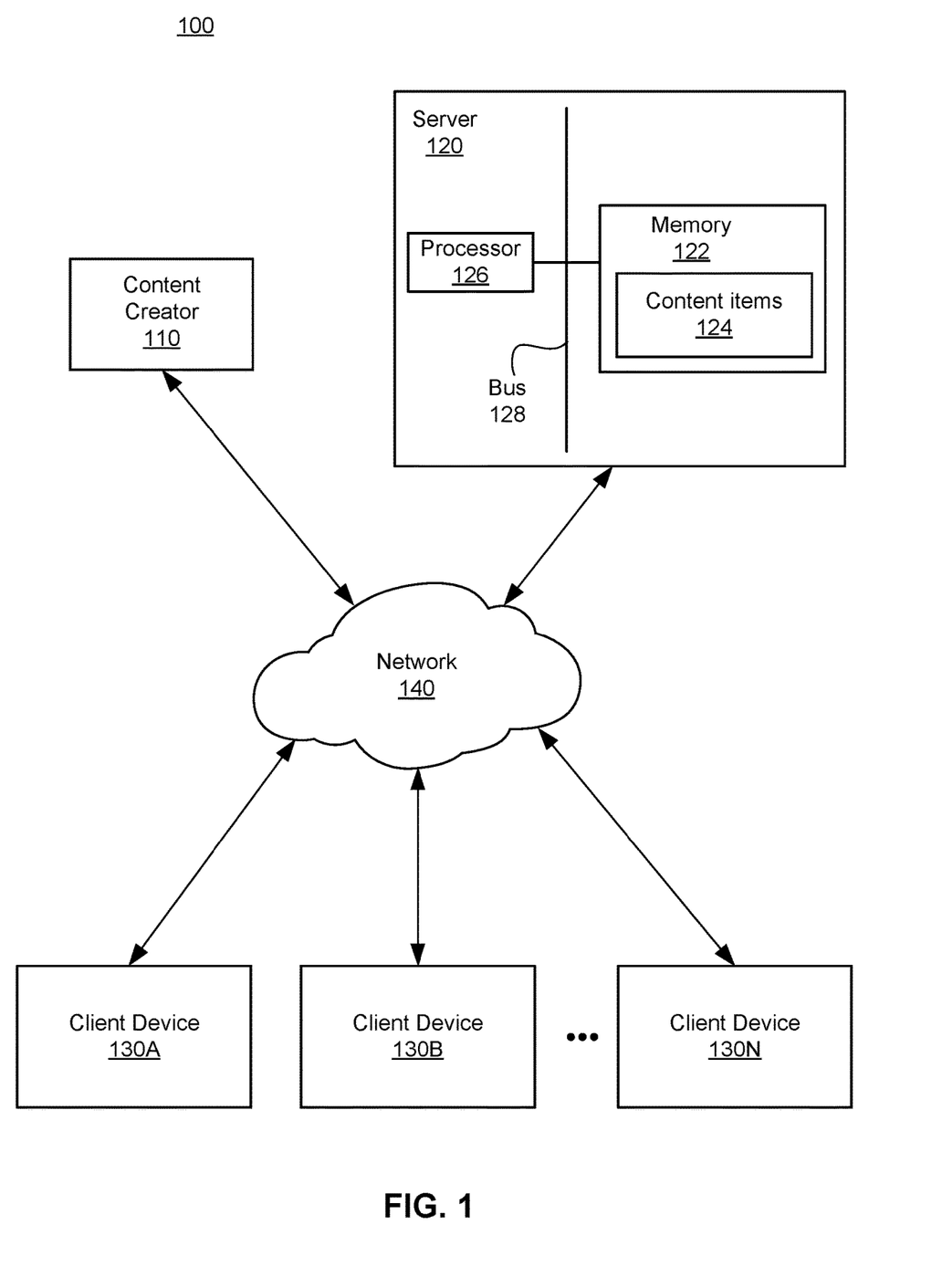
FIG. 1 is a block diagram of a computer game system, according to an embodiment.

FIG. 1 illustrates an embodiment of a computer game system 100 in which the techniques described herein may be practiced. In the embodiment shown, the system 100 includes, among other components, a content creator 110, a server 120, client devices 130, and a network 140. In other embodiments, the system 100 may include different or additional elements. For example, the system 100 may include additional content creators 110 or servers 120 and may include any number of client devices 130. Furthermore, the functionality may be distributed among the elements in other manners than those described.

The content creator 110, the server 120, and the client devices 130 are configured to communicate via the network 140. The network 140 includes any combination of local area or wide area networks, using wired or wireless communication systems. In one embodiment, the network 140 uses standard communications technologies or protocols. For example, the network 140 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 140 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 140 may be represented using any suitable format, such as hypertext markup language (HTML) or extensible markup language (XML). In some embodiments, all or some of the communication links of the network 140 may be encrypted using any suitable technique or techniques.

The content creator 110 is a computing device, such as a personal computer, a mobile phone, a tablet, or the like, which enables a game developer to create content items (e.g., characters and environment information) for a computer game. For this purpose, the content creator 110 includes a processor and a memory (not shown) that stores various software modules for creating content items. The created content items are sent to the server 120 for storing on its memory 122.

The server 120 is a computing device that includes a processor 126 and a memory 122 connected by a bus 128. The memory 122 includes various executable code modules or non-executable content items 124. The server 120 may receive and route messages between the content creator 110 and the client devices 130. Content items 124 may be sent to the client devices 130 via the network 140.

The processor 126 is capable of executing instructions, sequential or otherwise, that specify operations to be taken, such as performance of some or all of the techniques described herein. The bus 128 connects the processor 126 to the memory 122, enabling data transfer from the one to the other and vice versa. Depending upon the embodiments, the server 120 may include additional elements conventional to computing devices.

Each client device 130 is a computing device that includes a game or other software. The client device 130 receives data objects from the server 120 and uses the data objects to render graphical representations of characters and environment in which the characters take actions in the game. Different client devices 130 can request different data objects from the server 120.

Although the embodiment of FIG. 1 is described as operating in a networked environment, in other embodiments, the client devices 130 are not connected via a network and the computer game is executed without exchanging messages or content items over any network. In such cases, any content items associated with the compute game may be received and installed on the client devices 130 using a non-transitory computer readable medium such as DVD ROM, CD ROM, or flash drive, etc.

Figure 2:
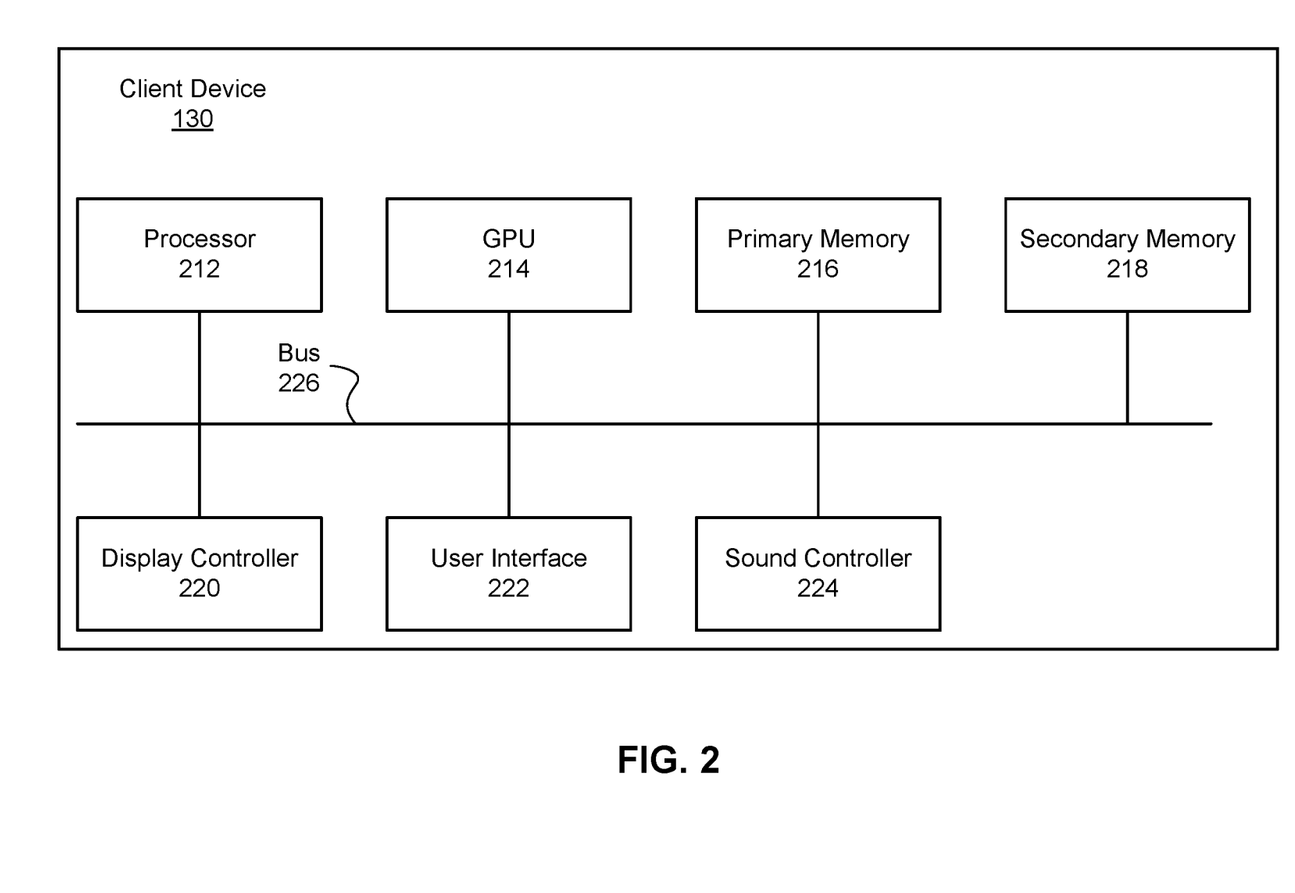
FIG. 2 is a block diagram of the client device of FIG. 1, according to an embodiment.

FIG. 2 is a block diagram of a client device 130 in which the techniques described herein may be practiced, according to an embodiment. The client device 130 can be any machine capable of executing instructions, and may be a standalone device or a connected (e.g., networked) set of devices, and may be a computing device such as a gaming system, a personal computer, a mobile phone, a tablet, or so on. The client device 130 includes a processor (CPU) 212, a graphics processing unit (GPU) 214, a primary memory 216, a secondary memory 218, a display controller 220, a user interface 222, a sound controller 224, and a bus 226. In other embodiments the client device 130 may include additional or other components. While only a single client device 130 is illustrated, other embodiments may include any collection of client devices 130 that individually or jointly execute instructions to perform any one or more of the methodologies discussed herein.

The primary memory 216 is a machine-readable medium that stores instructions (e.g., software) embodying any one or more of the methodologies or functions described herein. For example, the primary memory 216 may store instructions that, when executed by the CPU 212, configure the CPU 212 to perform a process, described below in detail with reference to FIG. 6. Instructions may also reside, partially or completely, within the CPU 212 or GPU 214, e.g., within cache memory, during execution of the instructions.

The term "machine-readable medium" should be taken to include a single medium or multiple media (e.g., a centralized or distributed database, or associated caches and servers) able to store instructions. The term "machine-readable medium" shall also be taken to include any medium that is capable of storing instructions for execution by the device and that cause the device to perform any one or more of the methodologies disclosed herein. The term "machine-readable medium" includes, but is not limited to, data repositories in the form of solid-state memories, optical media, and magnetic media.

The secondary memory 218 is a memory separate from the primary memory 216. Similar to the primary memory 216, the secondary memory 218 is a machine-readable medium that stores instructions (e.g., software) embodying any one or more of the methodologies or functions described herein. For example, the primary memory 216 may be a hard drive of the client device 130, and the secondary memory 218 may be a game disc for an electronic game. As a specific example, the primary memory 216 may store a game system 300 that uses data stored on the secondary memory 218. Primary memory 216 and secondary memory 218 are described in greater detail with reference to FIG. 3 below.

The CPU 212 is processing circuitry configured to carry out the instructions stored in the primary memory 216 or secondary memory 218. The CPU 212 may be a general-purpose or embedded processor using any of a variety of instruction set architectures (ISAs). Although a single CPU is illustrated in FIG. 2, the client device 130 may include multiple CPUs 212. In multiprocessor systems, each of the CPUs 212 may commonly, but not necessarily, implement the same ISA.

The GPU 214 is a processing circuit specifically designed for efficient processing of graphical images. The GPU 214 may render objects to be displayed into a frame buffer (e.g., one that includes pixel data for an entire frame) based on instructions from the CPU 212. The GPU 214 may include one or more graphics processors that may execute graphics software to perform a part or all of the graphics operations.

The display controller 220 is a circuit that generates a video signal using graphical data from the GPU 214. For example, the display controller 220 drives a display device (e.g., a liquid crystal display (LCD) and a projector). As such, an electronic game can be displayed as images or a video sequence through the display controller 220.

The sound controller 224 is a circuit that provides input and output of audio signals to and from the client device 1130. For purposes of the destruction of objects, the sound controller 224 can provide audio signals that align with the destruction.

The user interface 222 is hardware, software, firmware, or a combination thereof that enables a user to interact with the client device 130. The user interface 222 can include an alphanumeric input device (e.g., a keyboard) and a cursor control device (e.g., a mouse, a trackball, a joystick, a motion sensor, or other pointing instrument). For example, a user uses a keyboard and mouse to control a character's action within a gameplay session that includes objects rendered by the client device 130. The gameplay session includes a simulation and rendering of objects, within which the user's game character operates. For example, the user's game character may sail a ship or wade through a body of water, drop an object such as a barrel into the body of water, or destroy a boat and watch the debris floating in the body of water, etc.

The client device 130 executes computer program modules for providing functionality described herein. As used herein, the term "module" refers to computer program instructions or other logic used to provide the specified functionality. Thus, a module can be implemented in hardware, firmware, or software. In some embodiments, program modules formed of executable computer program instructions are loaded into memory and executed by the CPU 212 or the GPU 214. For example, program instructions for the process of FIG. 6 can be loaded into the primary memory 216 or secondary memory 218, and executed by the CPU 212 and GPU 214.

Figure 3:
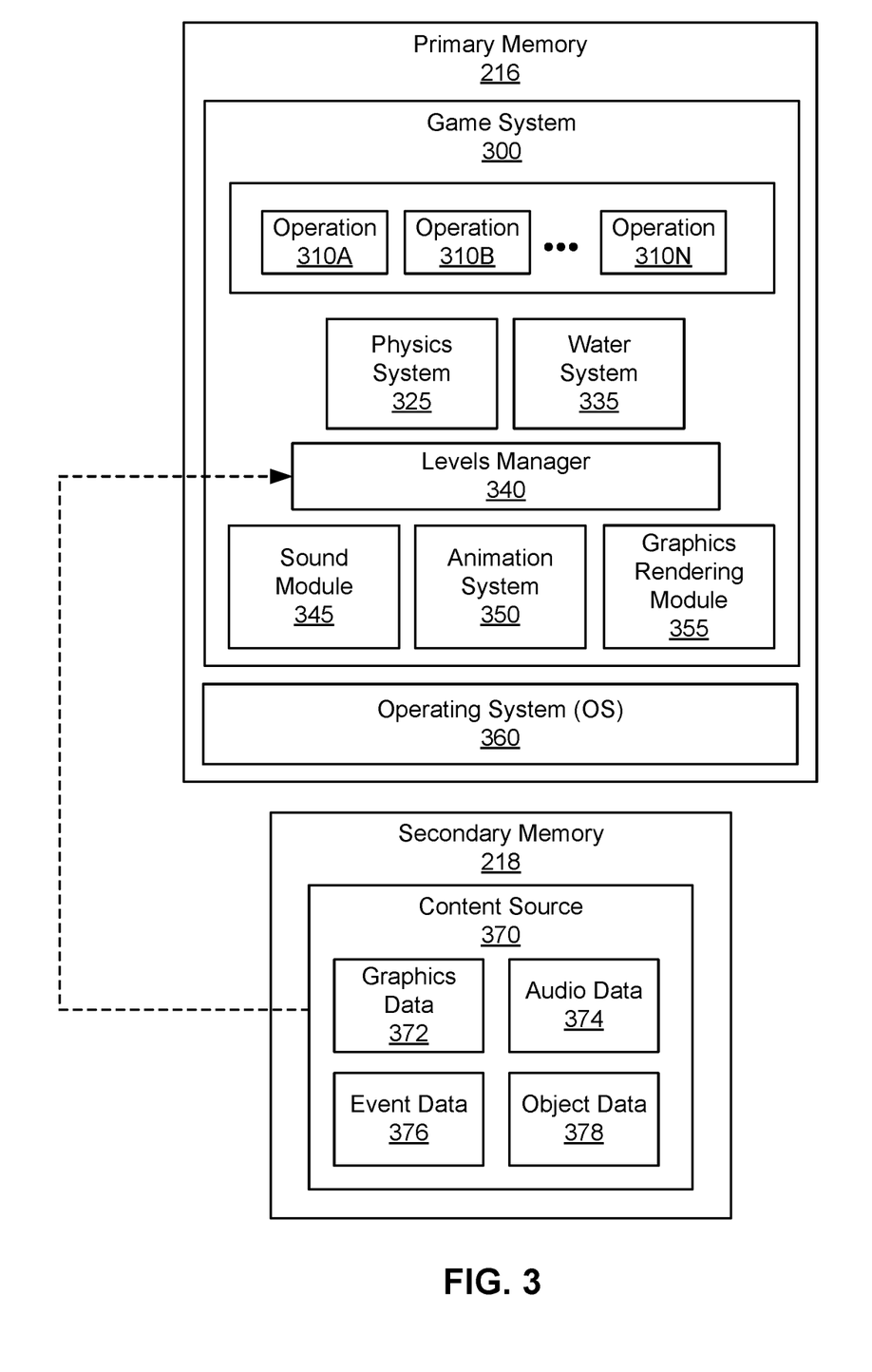
FIG. 3 is a block diagram of software modules in memory of the client device of FIG. 2, according to an embodiment.

FIG. 3 is a block diagram of software modules in memory of the client device 130 of FIG. 2, according to an embodiment. In particular, FIG. 3 illustrates software modules in the primary memory 216 and the secondary memory 218 of the client device 130. The primary memory 216 may store, among other modules, a game system 300 and an operating system ("OS") 360. The secondary memory 218 may store, among other modules, a content source 370. The primary memory 216 and secondary memory 218 may include other modules not illustrated in FIG. 3. Furthermore, in other embodiments, the primary memory 216 and secondary memory 218 may each store software modules and data represented herein as stored in the other.

The game system 300 includes a physics system 325, a water system 335, a level manager 340, a sound module 345, an animation system 350, and a graphics rendering module 355. These modules collectively form a "game engine" of the game system 300. The electronic game includes at least the game system 300 and may additionally include data stored at the secondary memory 218 in some embodiments.

The game system 300 performs operations 310A through 310N (collectively referred to as "the operations 310") to run gameplay sessions of the electronic game, including the simulation of objects interacting with a body of water. Specifically, the game system 300 performs these operations 310 to instantiate objects in the gameplay session, render various instantiated objects within the gameplay session (e.g., the user's game character and objects in a particular direction or field of view from the game character), and simulate interactions between the objects as well as between objects and the body of water. The operations 310 refer to computing operations that result in changes in various parameters (e.g., states of objects and user status) based upon certain events (e.g., user interactions, expirations of time, and triggers occurring in the gameplay session).

Some operations 310 are associated with the interaction of one or more objects with the body of water. Examples of operations associated with interaction between an object and the body of water may include simulating waves on the surface of the body of water, determining the object is partially or completely submerged in the body of water, determining a force exerted by the body of water on the object, determining pressure exerted on the body of water by the object, and rendering an animation of the object moving relative to the body of water. Particular examples of movement of the object include a ship or character traveling through the water creating a wake and debris and other objects bobbing on the surface of the body of water. When executing the operations 310, the game system 300 may communicate with the components of the game engine (e.g., the physics system 325, the water system 335, etc.) through application programming interfaces (APIs). For example, when the body of water exerts a force on the object, the force may be passed to the physics system 325, which determines how the object responds to the exerted force.

The level manager 340 creates and maintains gameplay sessions using objects it retrieves from the primary memory 216 or secondary memory 218. For example, upon the game system 300 launching a gameplay session, the game system 300 determines which objects are or could be involved in the gameplay session, and loads them into primary memory 216, e.g., at the level manager 340. Other modules of the game system 300 can request one or more objects from the level manager 340, which responds to the requests by sending the objects to the module of the game system 300 that sent the request. The level manager 340 may also receive input from the user interface 222, the operations 310, or other modules of the game system 300, which may impact a game session, e.g., instruct the level manager 340 to destroy an object, creating debris which may then float on or otherwise interact with the body of water.

The physics system 325 models and simulates the dynamics of objects in the virtual environment. After an operation 312 is initiated in the game system 300, the physics system 330 models how an action or event of the operation 312 affects the object associated with the operation 312. For example, the physics system 325 may model how a ball responds to being kicked by a character. Depending on the action and object, other objects and actions may become associated with the action or object. To return to the previous example, if the ball kicked by the character strikes another ball, the physics system 325 may determine the resulting speed and direction of travel of each ball after the collision. A single action can thus impact multiple objects.

The water system 335 models and simulates bodies of water and interactions between the bodies of water and objects. In some embodiments, the water system 335 models the body of water as tessellated copies of a repeated tile (e.g., a square, rectangular, or hexagonal, etc. area of water of fixed dimensions). The water system 335 models waves for one instance of the tile using an appropriate method (e.g., a FFT-based wave simulation algorithm) constrained by boundary conditions at the edge of the tile that may allow a wave leaving one side of the tile to re-enter at the opposite side of the tile. Thus, when the tile is repeated, the wave appears to seamlessly traverse one tile into the next. The size of the tiles may be selected to balance computational efficiency with keeping the number of tiles visible in an ultimately rendered scene below a threshold to maintain believability. The water system 335 also defines a reactive region in which objects may influence the water (e.g., an area immediately surrounding a character). Simulation of the reactive region is more computationally expensive than simulation of the tiles. Therefore, the size of the reactive region may be selected to balance computational efficiency with making the reactive region large enough to effectively simulate the influence of currently significant objects with the body of water. Various embodiments of the water system 335 are described in greater detail below with reference to FIG. 5.

The sound module 345 generates sounds corresponding to actions occurring in the gameplay session. For example, the destruction of a "building" object may correspond to an "explosion" sound. Animation data from the animation system 350 may be sent to the sound module 345 to enable the sound module 345 to produce appropriate sound data that is sent to the sound controller 224.

The animation module 360 performs kinematic animation of objects based on the operations 312 from the game system 300. For example, if an operation 312 specifies that a character's arm is to punch another character, the animation module 360 generates a series of poses that collectively form the movement of the character's body that results in the punching action. For this purpose, the animation module 360 is capable of performing forward kinematics operations, inverse kinematics operations, and generation of transformation matrix.

The graphics rendering module 355 renders graphics from the animation system 350 and level manager 340 to generate an image frame. For this purpose, the graphics rendering module 355 may receive transformation matrices that indicate changes in vertices of polygons that collectively form a surface of a character or other object. The graphics rendering module 355 may also receive information about the virtual environment from the level manager 340. The graphics rendering module 355 sends graphical data to the GPU 214 to render images of the virtual environment on a display, e.g., a display of the client device 130 or a display connected to the client device 130, via the display controller 220.

The OS 360 manages computer hardware and software resources. Specifically, the OS 360 acts as an intermediary between programs and the computer hardware. For example, the OS 360 can perform basic tasks, such as recognizing input from the user interface 222 and sending output to the display controller 220.

The content source 370 in the secondary memory 218 includes various data, including graphics data 372, audio data 374, event data 376, and object data 378. Depending upon the embodiment, some or all of the data in the content source 370 may instead be in the primary memory 216. The content source 370 sends data to the level manager 340 upon receiving a request for the data from the level manager 340. For example, upon the level manager 340 receiving a request for information regarding an object from the physics system 325 or the water system 335, the level manager 340 requests the information from the content source 370, which sends the information to the level manager 340 and forwards it to the requesting system.

The graphics data 372 includes graphics data, such as meshes and textures for one or more objects. The graphics rendering module 355 may retrieve graphics data 372 and use it to render a visual representation of one or more objects. The audio data 374 includes data relating to sound, e.g., clips of sound. Each portion of audio data 374 may be associated with one or more objects. The sound module 345 may retrieve audio data 374 and use it to generate sounds corresponding to actions occurring in the gameplay session. The event data 376 includes game events, which occur during the gameplay session. The object data 378 includes objects. Each object may include a variety of information depending upon the embodiment. This may include an identifier used to associate an object with a mesh assignment or a gravity assignment. In an embodiment, the object data 378 includes the graphics data 372.

Example Water Simulation

Figure 4:
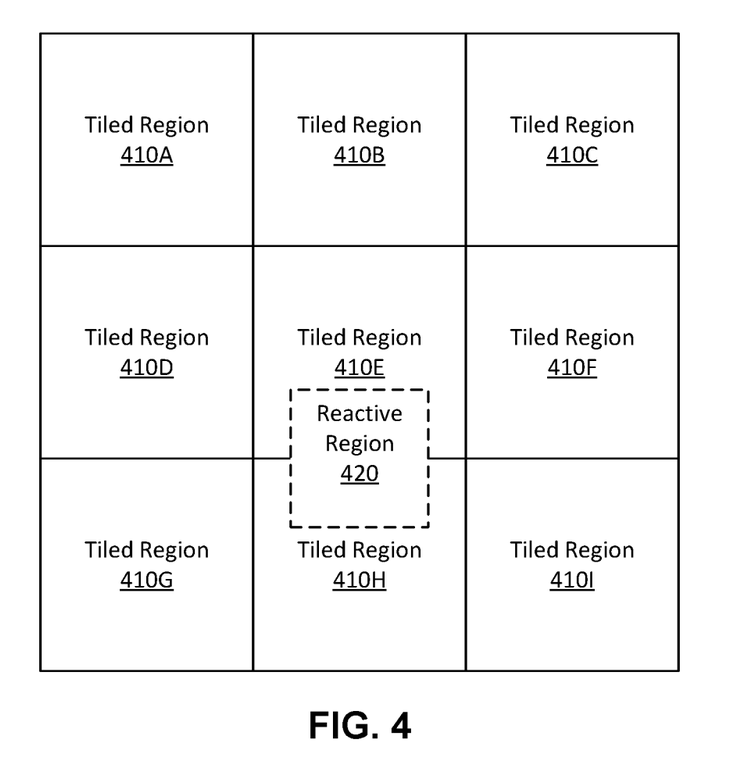
FIG. 4 illustrates a conceptual representation of a body of water including reactive region and multiple tiled regions, according to an embodiment.

FIG. 4 illustrates a conceptual representation of a simulation of a body of water, according to one embodiment. The body of water is divided up into tiled regions 410A through 410I. Using repeating tile regions 410 of the same dimensions enables waves to be simulated for a single tile region using periodic boundary conditions and copied to the other tile regions to form a repeating pattern that is a reasonable approximation of a real body of water. Although FIG. 4 shows nine tiled regions 410 arranged in a three by three square, in practice, the tiled regions 410 may be repeated as many times as necessary to build a body of water of the desired size.

The body of water shown in FIG. 4 also has a reactive region 420 overlaid on the tiled regions 410. Within the reactive region 420, the influence of objects on the water is simulated. While the reactive region 420 is shown as being smaller than the tiled regions 420, this is not required. Furthermore, the reactive region 420 may be moved (e.g., to follow the location of a character controlled by a user such that the water immediately around the character always interacts with objects while water further away from the character does not).

Figure 5:
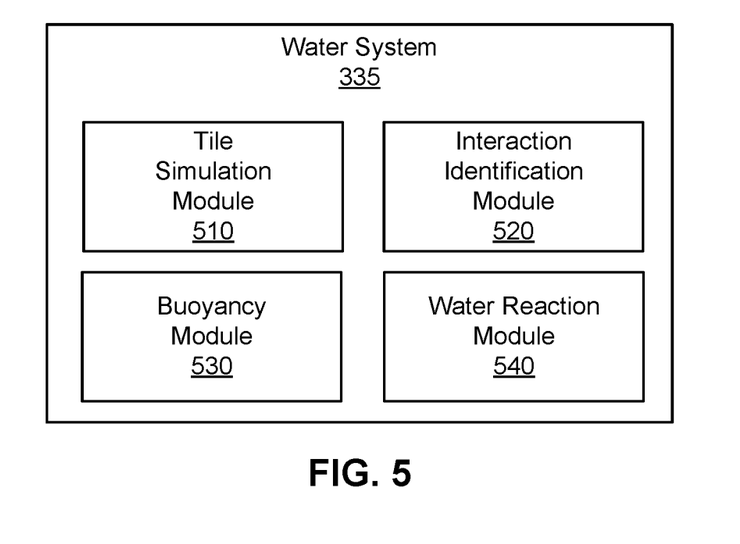
FIG. 5 is a block diagram of the water system of the client device shown in FIG. 3, according to an embodiment.

FIG. 5 illustrates an embodiment of the water system 335 configured to simulate the body of water using the representation shown in FIG. 4. In the embodiment shown in FIG. 5, the water system 335 includes a tile simulation module 510, an interaction identification module 520, a buoyancy module 530, and a water reaction module 540. In other embodiments, the water system includes different or additional elements. Furthermore, the functionality may be distributed between elements in different manners than described.

The tile simulation module 510 divides the body of water up into tile regions 410 and simulates the waves for a single tile region that are then replicated across all of the tile regions. In one embodiment, the tile simulation module 510 simulates the waves for a tile region 420 by expressing the wave heights as a sum of sinusoids with complex, time-dependent amplitudes and using a FFT process to generate a height for the surface of the water (the "wave height") at each of a set of discrete points arranged in a grid within the tile region. The shape of the water surface between grid points can either be interpolated or calculated using a discrete Fourier transform. The tile simulation module 510 uses a random or pseudo random process to statistically generate a distribution of waves of different frequencies. For example, the JONSWAP spectrum, the Phillips spectrum, or the Pierson-Mosokowitz spectrum may be used to generate a believable distribution of wave frequencies.

Representing the waves in the tile region 410 in this way enables the vertical height and horizontal velocity to be decoupled. Having evaluated the wave height and the derivative of the wave height function, a time step simulation scheme can be used to determine the vertical propagation of the waves. Assuming a linear representation of the wave heights is used, an explicit scheme for time stepping can be both fast and stable. Alternatively, an implicit approach may be used if greater accuracy is desired.

In one embodiment, the tile simulation module 510 divides the body of water up into tiles at multiple (e.g., three) different scales and simulates waves at each scale before aggregating the results. By selecting tile sizes for the different scales that are not multiples of each other, visual artifacts caused by the periodicity of the tiles at any given scale can be reduced or eliminated.

The interaction identification module 520 identifies interactions between objects and the water within the reactive region 420. In one embodiment, the interaction identification module 520 defines a spherical collision volume for each object in the reactive region. The spherical collision volume for an object encompasses the object. The interaction identification module 520 determines whether the spherical collision volume intersects with the water and, if so, passes the object to the reactive region simulation module 530. Using a spherical collision volume makes determining intersection with the water computationally efficient, However, other collision volumes may be used.

The buoyancy module 530 calculates the force exerted by the water on objects. In one embodiment, the buoyancy module 530 determines whether any portion of an object's collision volume is submerged. Assuming at least a portion of the collision volume is submerged, the buoyancy module 530 determines the volume of the submerged portion and calculates a buoyancy force using the submerged volume, the acceleration due to gravity, and the density of the water. In some embodiments, the acceleration due to gravity and/or the density of the water may be configurable. Regardless of how the buoyancy force is calculated, the buoyancy module 530 provides the calculated force to the physics system 325, which simulates the effect of the buoyancy force on the object in combination with any other applied forces (e.g., due to wind, propulsion by a motor, or collisions with other objects, etc.).

The water reaction module 540 determines the impact of objects on the water in the reactive region 420. In one embodiment, the water reaction module 540 determines the impact of an object by calculating an amount of pressure exerted by the object. Without this external pressure, the equation of motion for the water is:

$$\frac{\partial \Phi}{\partial t} = -gh \quad \text{Equation 1}$$

where $\Phi$ is the potential field, h is the water level relative to the mean water level, and g is acceleration due to gravity. Adding in the pressure exerted by the object gives:

$$\frac{\partial \Phi}{\partial t} = -gh - \frac{P}{\rho} \quad \text{Equation 2}$$

where P is the exerted pressure and $\rho$ is the density of the water.

The exerted pressure may be calculated as a ram pressure by considering the component of velocity normal to the surface of the collision volume of the object, v:

$$P = \frac{1}{2}\rho v^2 \quad \text{Equation 3}$$

In one embodiment, the water reaction module 540 evaluates the ram pressure for each point on a simulation grid that is within or above the submerged portion of the collision volume and accumulates the results. Because the pressure is evaluated in the spatial domain and wave simulation is performed in the frequency domain, the water reaction module 540 applies a forward FFT to the accumulated results and injects them into the water simulation. The water reaction module 540 may evaluate the ram pressure and the resulting disturbances in the water assuming the water has a flat surface at the mean level with the resulting disturbances in the water being superimposed with the waves generated by tile simulation module 510.

In general, the application of pressure by an object on the water will generate additional waves, such as a wake. In some embodiments, the water reaction module 540 applies damping to these waves as they propagate through the reactive region 420 to prevent them from reaching the edge of the reactive region and wrapping around back into the other side of the simulation or otherwise causing visual artifacts. A ramp-down function may be applied to waves in a periphery region (e.g., within 5% of the reactive region width from an edge of the reactive region) to ensure large waves that are not reduced to zero by the damping do not reach the edge of the reactive region and create a visual discontinuity in the surface of the water.

Example Method

Figure 6:
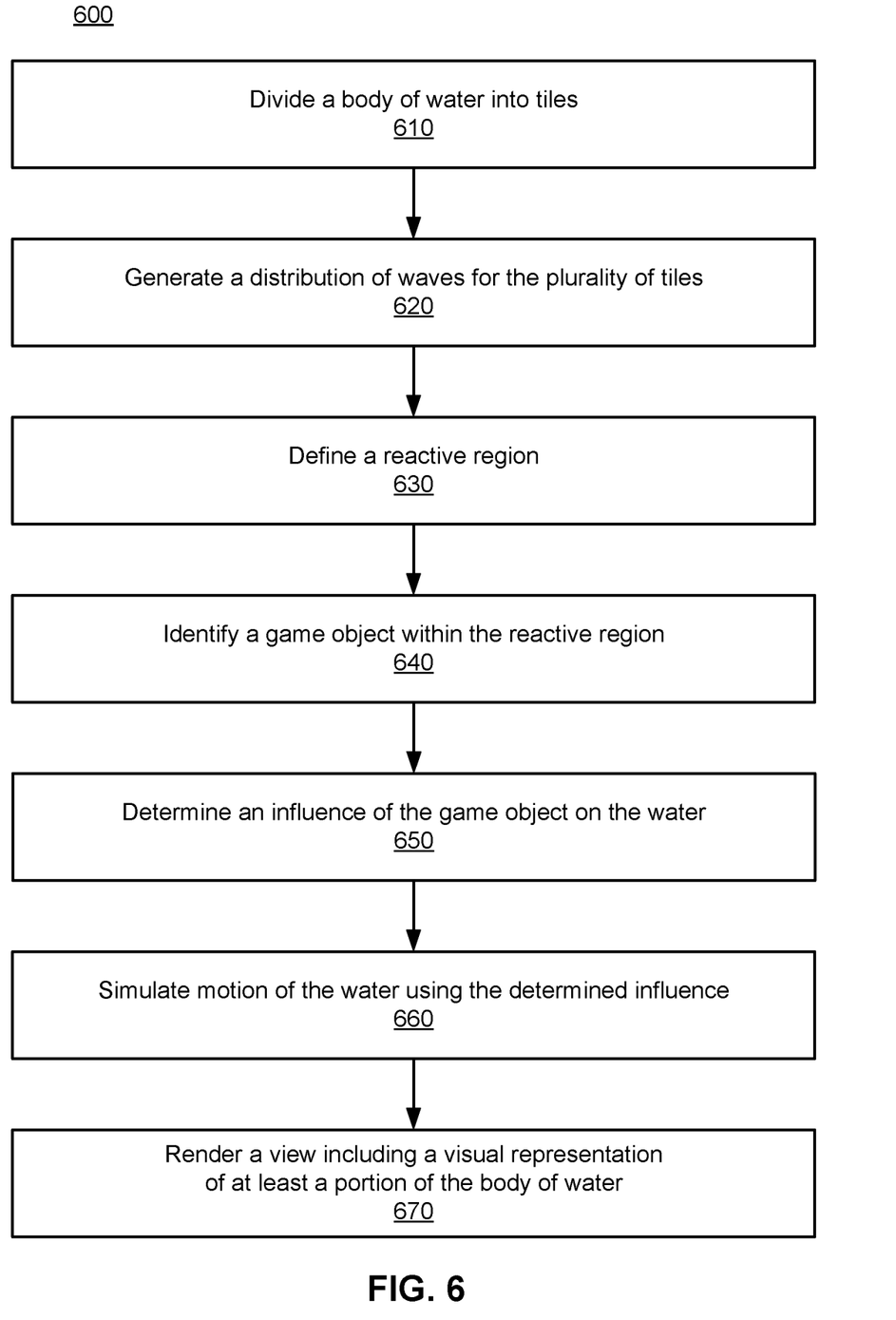
FIG. 6 is a flowchart illustrating a method for rendering a view of a virtual environment that includes a body of water, according to an embodiment.

FIG. 6 illustrates a method 600 for rendering a view of a virtual environment that includes a body of water, according to an embodiment. The steps of FIG. 6 are illustrated from the perspective of various elements of the game system 300 performing the method 600. However, some or all of the steps may be performed by other entities or components. In addition, some embodiments may perform the steps in parallel, perform the steps in different orders, or perform different steps.

In the embodiment shown in FIG. 6, the method 600 begins with the tile simulation module 510 dividing 610 the body of water into tiles 410. The tiles 410 have consistent size and shape with each other and tessellate to cover some or all of the body of water. The tile simulation module 510 generates 620 a distribution of waves. As described previously, the wave distribution may be generated in frequency space using a frequency distribution such as the JONSWAP spectrum. The distribution of waves may be generated 620 for a single tile (e.g., tile 410A) using periodic boundary conditions and duplicated to the other tiles (e.g., tiles 410B through 410I).

The water reaction module 540 defines 630 a reactive region 420. The reactive region 420 overlays at least some of the tiles 410. For example, the reactive region 420 may be located entirely within one of the tiles 410 or span the border between two or more tiles. The interaction identification module 520 identifies 640 an object within the reactive region 420.

The water reaction module 540 determines 650 the influence of the object on the water within the reactive region 420. In one embodiment, the water reaction module 540 determines 650 whether the object exerts pressure on the water or the water exerts a force on the object based on one or more properties of the object. For example, if the parent instance of the object has a rigid body component, the object may exert pressure on the water and otherwise the water may exert force on the object. In another embodiment, the water reaction module 540 determines 650 whether the object exerts pressure on the water or the water exerts a force on the object based on one or more properties of the object but the water always exerts force on the object (assuming at least a portion of the object is submerged in the water).

Assuming the object influences the water in the reactive region 420, the water reaction module 540 simulates 660 the motion of the water based on the determined influence. For example, as described previously, the water reaction module 540 may calculate the ram pressures exerted by the object at one or more locations in the simulation grid and calculate the resulting disturbances in the water. In some embodiments, the water may also exert a buoyancy force on the object. In which case, the buoyancy module 530 calculates the resulting buoyancy force based on the volume of object that intersects with the water and provides the calculated force to the physics system 325. The physics system 325 may use the buoyancy force (in combination with any other forces acting on the object) to simulate the motion of the object.

The graphics rendering module 355 renders 670 a view of the virtual environment that includes at least a portion of the body of water. Depending on the game implementation, the view may be a first, second, or third person view of a character controlled by the user. The view may also be from another camera position selected by the user or coded into the game. Using the method 600, a believable rendering of the body of water can be provided in real time using modest computational resources. Furthermore, the body of water may exert forces on objects, have pressure exerted on it by objects, or both, further increasing the believability of the rendering. Additionally or alternatively, the method 600 may be used to generate a computer simulation or sequence of images (e.g., a movie clip) that can be stored and displayed at a later time.

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A method for rendering a view of a virtual environment that includes a body of fluid, the method comprising:
   dividing the body of fluid into a plurality of tiles;
   generating a distribution of waves for the plurality of tiles;
   defining a reactive region overlaying at least some of the plurality of tiles;
   identifying an object within the reactive region;
   determining an influence of the object on fluid within the reactive region, wherein determining the influence of the object on fluid within the reactive region comprises calculating a ram pressure exerted by the object on the fluid within the reactive region;
   simulating motion of the fluid in the reactive region using the determined influence of the object and the distribution of waves; and
   rendering a frame of a video sequence including the view of the virtual environment, the view including a visual representation of at least a portion of the body of fluid.

2. The method of claim 1, wherein the distribution of waves is generated using a Joint North Sea Wave Observation Project spectrum.

3. The method of claim 1, wherein the distribution of waves is generated in a frequency domain and the ram pressure is calculated in a spatial domain, and the method further comprises converting the ram pressure into the frequency domain.

4. The method of claim 1, wherein simulating motion of the fluid in the reactive region comprises:
   determining a disturbance to the fluid in the reactive region caused by the influence of the object; and
   propagating the disturbance through the reactive region, wherein the disturbance is damped as it propagates through the reactive region.

5. The method of claim 1, further comprising determining, based on one or more properties of the object, that the object will interact with the fluid in the reactive region.

6. The method of claim 1, further comprising:
   calculating a force exerted on the object; and
   simulating motion of the object using the force exerted by the fluid on the object.

7. The method of claim 1, further comprising:
   identifying a second object having a collision volume that intersects with the body of fluid;
   determining that the second object does not influence the fluid within the reactive region;
   determining a force exerted by the fluid in the reactive region on the second object; and
   simulating motion of the second object using the force exerted by the fluid on the second object.

8. The method of claim 1, wherein the fluid is water.

9. A non-transitory computer-readable medium comprising instructions rendering a view of a virtual environment that includes a body of fluid that, when executed by a computing device, cause the computing device to perform operations comprising:
- dividing the body of fluid into a plurality of tiles;
- generating a distribution of waves for the plurality of tiles;
- defining a reactive region overlaying at least some of the plurality of tiles;
- identifying an object within the reactive region;
- determining an influence of the object on fluid within the reactive region, wherein determining the influence of the object on fluid within the reactive region comprises calculating a ram pressure exerted by the object on the fluid within the reactive region;
- simulating motion of the fluid in the reactive region using the determined influence of the object and the distribution of waves; and
- rendering a frame of a video sequence including the view of the virtual environment, the view including a visual representation of at least a portion of the body of fluid.

10. The non-transitory computer-readable medium of claim 9, wherein the distribution of waves is generated in a frequency domain and the ram pressure is calculated in a spatial domain, and the operations further comprise converting the ram pressure into the frequency domain.

11. The non-transitory computer-readable medium of claim 9, wherein simulating motion of the fluid in the reactive region comprises:
- determining a disturbance to the fluid in the reactive region caused by the influence of the object; and
- propagating the disturbance through the reactive region, wherein the disturbance is damped as it propagates through the reactive region.

12. The non-transitory computer-readable medium of claim 9, wherein the operations further comprise:
- calculating a force exerted on the object; and
- simulating motion of the object using the force exerted by the fluid on the object.

13. The non-transitory computer-readable medium of claim 9, wherein the operations further comprise:
- identifying a second object having a collision volume that intersects with the body of fluid;
- determining that the second object does not influence the fluid within the reactive region;
- determining a force exerted by the fluid in the reactive region on the second object; and
- simulating motion of the second object using the force exerted by the fluid on the second object.

14. A video sequence depicting a view of a virtual environment that includes a body of fluid, the video sequence comprising at least a subset of frames generated by:
- dividing the body of fluid into a plurality of tiles;
- generating a distribution of waves for the plurality of tiles;
- defining a reactive region overlaying at least some of the plurality of tiles;
- identifying an object within the reactive region;
- determining an influence of the object on fluid within the reactive region, wherein determining the influence of the object on fluid within the reactive region comprises calculating a ram pressure exerted by the object on the fluid within the reactive region;
- simulating motion of the fluid in the reactive region using the determined influence of the object and the distribution of waves; and
- rendering a frame of the video sequence including the view of the virtual environment, the view including a visual representation of at least a portion of the body of fluid.

15. The video sequence of claim 14, wherein the distribution of waves is generated in a frequency domain and the ram pressure is calculated in a spatial domain, and at least the subset of frames are further generated by converting the ram pressure into the frequency domain.

16. The video sequence of claim 14, wherein at least the subset of frames are further generated by:
- identifying a second object having a collision volume that intersects with the body of fluid;
- determining that the second object does not influence the fluid within the reactive region;
- determining a force exerted by the fluid in the reactive region on the second object; and
- simulating motion of the second object using the force exerted by the fluid on the second object.

17. The video sequence of claim 14, wherein the distribution of waves is generated using a Joint North Sea Wave Observation Project spectrum.

18. The video sequence of claim 14, wherein simulating motion of the fluid in the reactive region comprises:
- determining a disturbance to the fluid in the reactive region caused by the influence of the object; and
- propagating the disturbance through the reactive region, wherein the disturbance is damped as it propagates through the reactive region.

19. The video sequence of claim 14, wherein at least the subset of frames are further generated by determining, based on one or more properties of the object, that the object will interact with the fluid in the reactive region.

20. The video sequence of claim 14, wherein at least the subset of frames are further generated by:
- calculating a force exerted on the object; and
- simulating motion of the object using the force exerted by the fluid on the object.

* * * * *